(No Model.)
C. H. KNIGHT.
SHAFT SUPPORT FOR VEHICLES.
No. 526,108. Patented Sept. 18, 1894.
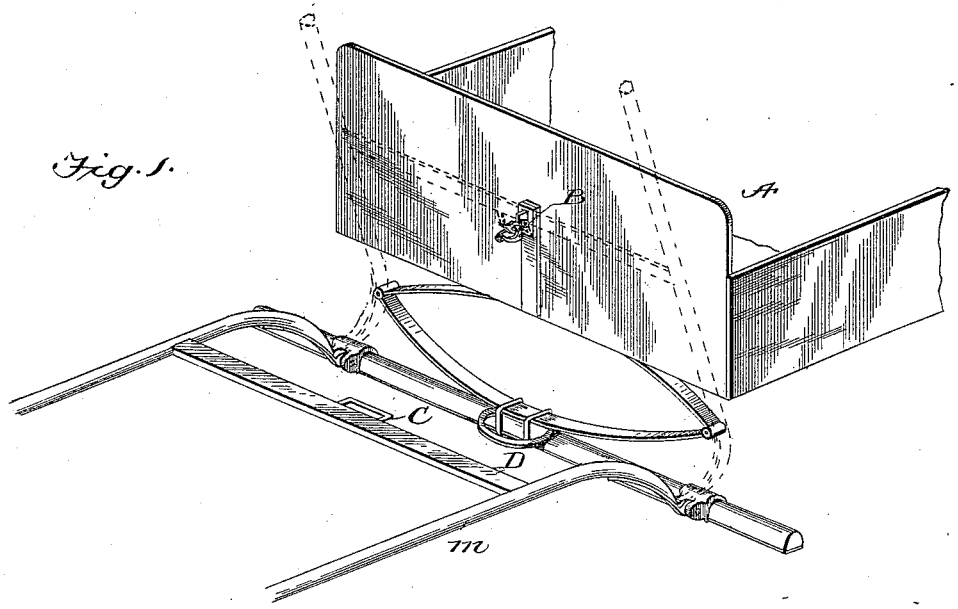
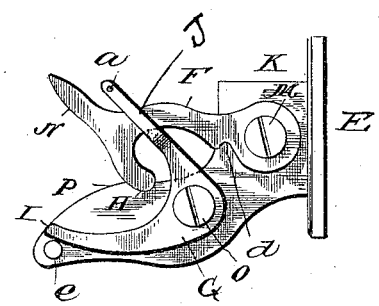
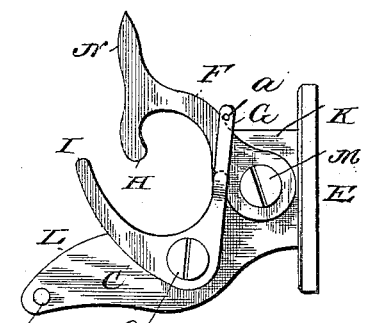
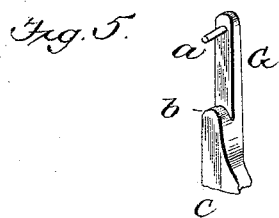
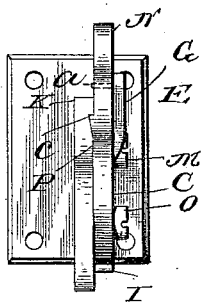
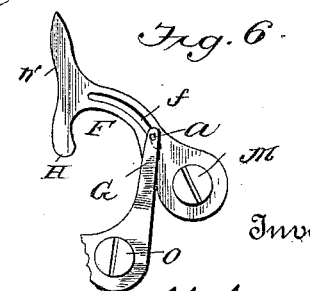
Witnesses
Inventor
Charles Henry Knight
per R. A. Morrison
Attorney

UNITED STATES PATENT OFFICE.

CHARLES H. KNIGHT, OF PHILADELPHIA, PENNSYLVANIA.

SHAFT-SUPPORT FOR VEHICLES.

SPECIFICATION forming part of Letters Patent No. 526,108, dated September 18, 1894.

Application filed November 24, 1893. Serial No. 491,917. (No model.)

*To all whom it may concern:*

Be it known that I, CHARLES H. KNIGHT, a citizen of the United States, residing at Philadelphia, in the county of Philadelphia and State of Pennsylvania, have invented certain new and useful Improvements in Tongue and Shaft Supports; and I do hereby declare the following to be a full, clear, and exact description of the invention, such as will enable others skilled in the art to which it appertains to make and use the same.

My invention relates to an improvement in shaft-supports, and its object is to provide a means for holding the shafts or tongue of a carriage or wagon in a raised position and thus keep them out of the way while the horse is being led or backed into position for the purpose of attaching him to the vehicle, and also to keep them in such position when the vehicle is housed and not in use.

Figure 1 is a perspective of a shaft support which embodies my invention. Fig. 2 is a side view of the bracket and arms carried thereby when in the lowered position. Fig. 3 is a like view when the arms are in the raised position. Fig. 4 is a front view of the bracket. Fig. 5 is a detail view. Fig. 6 is a modification of my invention as shown in Fig. 3.

A represents the body of a vehicle to the front of which is attached the bracket B. This bracket is composed of a back or base plate E, provided with perforations through which screws or bolts may be inserted to secure the same to any suitable support. The base E has an angular extension K attached thereto, or made integral therewith. This extension carries a hook-arm F, and a cam G each loosely pivoted thereto by screws or bolts M and O. This arm has a notch *d* and a boss *c* for a purpose hereinafter described. The cam G is provided with two arms or extensions I and J, as shown in Fig. 2. The arm J carries near its outer end, a pin *a*, which comes in contact with the upper side of the arm F, as shown in Figs. 2 and 3, or works in a slot in said arm as shown in Fig. 6. It also has a shoulder *b*, see Fig. 5, on which rests the arm F. The shafts *m* are provided with a cross piece D, to which near its center is secured a loop C.

The operation of the supporting device is as follows, viz: When the shafts are raised, the loop C rides upon the curved side L of the arm K until it strikes the arm F and raises the same allowing the hook H to fall in the loop C thereby retaining the shafts in a raised position. When it is desired to unhook the shafts, they are raised a little higher, when the loop C strikes the arm J of the cam G, and forces it back thereby lifting the arm F, which rests on the shoulder *b*, see Figs. 3 and 5. On lowering the shafts, the loop C being released strikes the cam-arm I, forcing it down and escaping therefrom, while at the same time the arm F, is brought to its normal position by the pin *a* contacting with the top of said arm, (Fig. 3,) or by working in the slot *f*, Fig. 6. A pin *e* on the arm K limits the outward movement of the cam G. The arm F is provided with a boss or an enlargement *c*, which, as shown in Figs. 2 and 4, comes in frictional contact with the arm K, thereby preventing any unpleasant rattling of the same.

It will thus be seen, that, by the use of my device, all danger of the horse stepping on the shafts and breaking them is removed, that he can readily and easily be led into position, and the shafts lowered by a single attendant, and, when the carriage is not in use, less space is required to house it, and the shafts at all times are kept out of the mud and dirt. My device is also free from springs which are liable to break or lose their tension and thereby render the same inoperative.

I do not limit myself to the particular form of bracket described and shown, but claim the right to make such changes as will fall within the scope of my invention.

Having thus described my invention, I claim—

1. A bracket consisting of the following parts: a base plate having an extension, a hook-arm and a cam both pivoted thereto, the cam having a shoulder on which the hook-arm rests and a pin for operating said hook-arm, substantially as set forth.

2. As an attachment for a carriage, a bracket consisting of a base-piece and an angular arm extending therefrom and having pivoted thereto a cam provided with a shoulder and a limiting pin and an arm resting on said shoulder, substantially as set forth.

3. As an attachment for carriages a bracket consisting of a base-plate, an arm extending therefrom having a limiting pin at its outer end, a cam pivoted to said arm whose movement is limited by said pin, substantially as set forth.

4. As an attachment for carriages, a bracket consisting of a base-plate, an angular arm extending therefrom provided with a cam having a shoulder, an arm resting on said shoulder having a retaining hook, both cam and arm being pivoted to said angular arm, substantially as set forth.

5. As an attachment for carriages, a bracket consisting of a base-plate, an angular arm extending therefrom having a limiting pin at its outer end, a cam having two forward extensions, an arm having a retaining hook, both cam and arm being pivoted to said angular arm as set forth.

6. As an attachment for carriages a bracket consisting of a base-piece and an angular arm extending therefrom provided with a cam having forward extending arms and an arm provided with a retaining hook, both pivoted thereto, substantially as described.

7. As an attachment for carriages, a bracket consisting of a base-plate, an angular arm extending therefrom having a limiting pin at its outer end, a cam having an arm whose movement is limited by said pin, an arm provided with a retaining hook, both cam and arm being pivoted to said angular arm as set forth.

8. As an attachment for carriages, a bracket consisting of a base and an arm extending therefrom having a cam and an arm both pivoted thereto, said arm having a slot, substantially as described.

9. As an attachment for carriages, a bracket consisting of a base and an angular arm extending therefrom having a cam provided with an extension carrying a pin, and a hook-arm having a slot in which said pin works, both pivoted to said angular arm, substantially as described.

10. As an attachment for carriages, a bracket consisting of a base and an angular arm extending therefrom having a cam and also an arm both pivoted thereto, and means for preventing rattling of the same, substantially as described.

11. As an attachment for carriages, a bracket consisting of a base and an angular arm extending therefrom having a cam and a hook-arm both pivoted thereto, said hook-arm having a boss or an enlargement for preventing rattling of the parts, substantially as described.

12. As an attachment for carriages, a bracket consisting of a base, an arm extending therefrom provided with a pin at its outer end, a cam having forward extensions, one extension limited by said pin, and the other having a shoulder and a pin, an arm resting on said shoulder, all operatively connected, substantially as set forth.

13. As an attachment for carriages, a bracket consisting of a base, an angular arm extending therefrom, a cam provided with an arm having a shoulder and an operating pin, an arm provided with a hook resting on said cam-shoulder, all operatively connected, substantially as set forth.

In testimony whereof I affix my signature in presence of two witnesses.

CHARLES H. KNIGHT.

Witnesses:
   THEO H. MCCALLA,
   GEO. GLAZIER.